United States Patent [19]

Hurley

[11] 4,018,046

[45] Apr. 19, 1977

[54] INFRARED RADIATION SUPPRESSOR FOR GAS TURBINE ENGINE

[75] Inventor: John F. Hurley, Huntington, Conn.

[73] Assignee: Avco Corporation, Stratford, Conn.

[22] Filed: July 17, 1975

[21] Appl. No.: 596,593

[52] U.S. Cl. .................................. 60/264; 60/266; 60/269; 60/39.5; 239/265.19

[51] Int. Cl.[2] .................... F02C 7/18; F02C 7/24

[58] Field of Search .......... 60/39.5, 264, 271, 266, 60/269; 239/265.11, 265.19

[56] References Cited

UNITED STATES PATENTS

| | | | |
|---|---|---|---|
| 2,674,845 | 4/1954 | Pouchot | 60/264 |
| 3,137,131 | 6/1964 | Tyler et al. | 239/265.11 |
| 3,146,584 | 9/1964 | Smith et al. | 60/271 |
| 3,210,934 | 10/1965 | Smale | 60/39.5 |
| 3,693,880 | 9/1972 | Versaw et al. | 60/271 |
| 3,910,375 | 10/1975 | Hache et al. | 60/264 |

FOREIGN PATENTS OR APPLICATIONS 852,829  11/1960  United Kingdom ............... 60/264

Primary Examiner—William L. Freeh
Assistant Examiner—Robert E. Garrett
Attorney, Agent, or Firm—Charles M. Hogan; Irwin P. Garfinkle

[57] ABSTRACT

Apparatus for suppressing infrared radiation emitted from hot metal parts at the aft end of a gas turbine engine and from the exhaust gas plume thereof is provided and such apparatus employs components which utilize an ejector principle to provide cooling action utilizing ambient air and such components may be provided with means for adjustment thereof to vary the amount of cooling ambient air.

29 Claims, 22 Drawing Figures

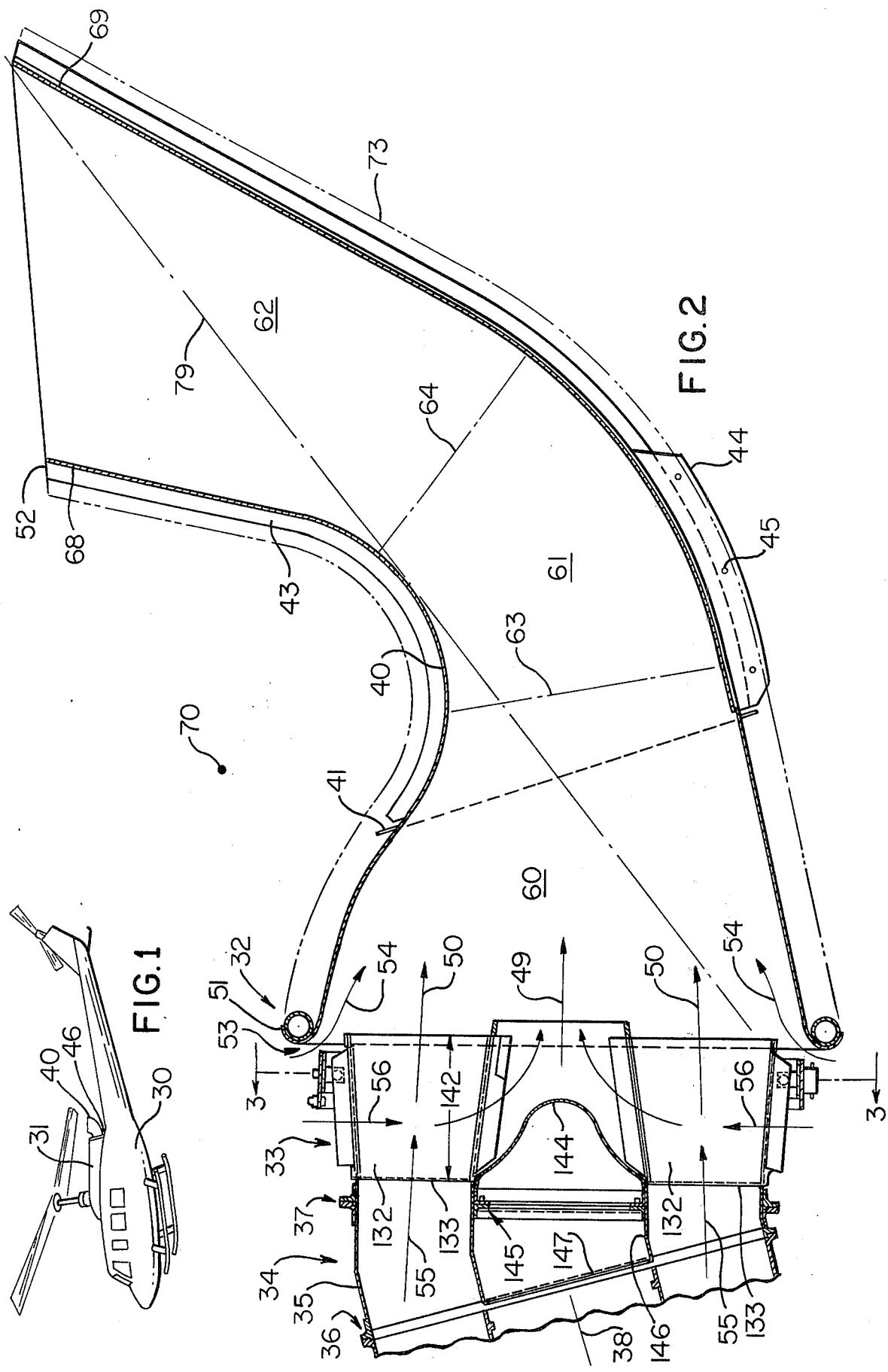

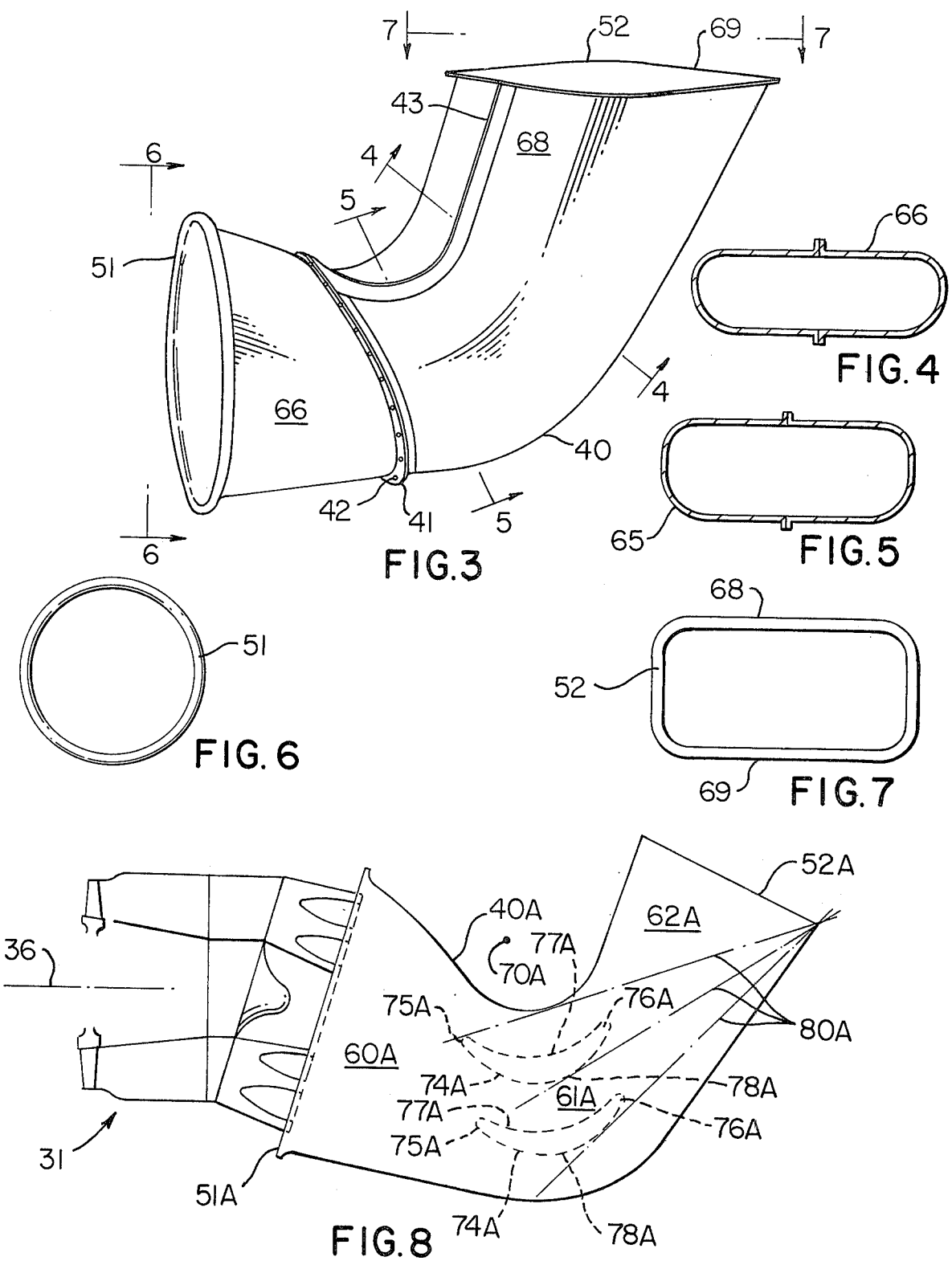

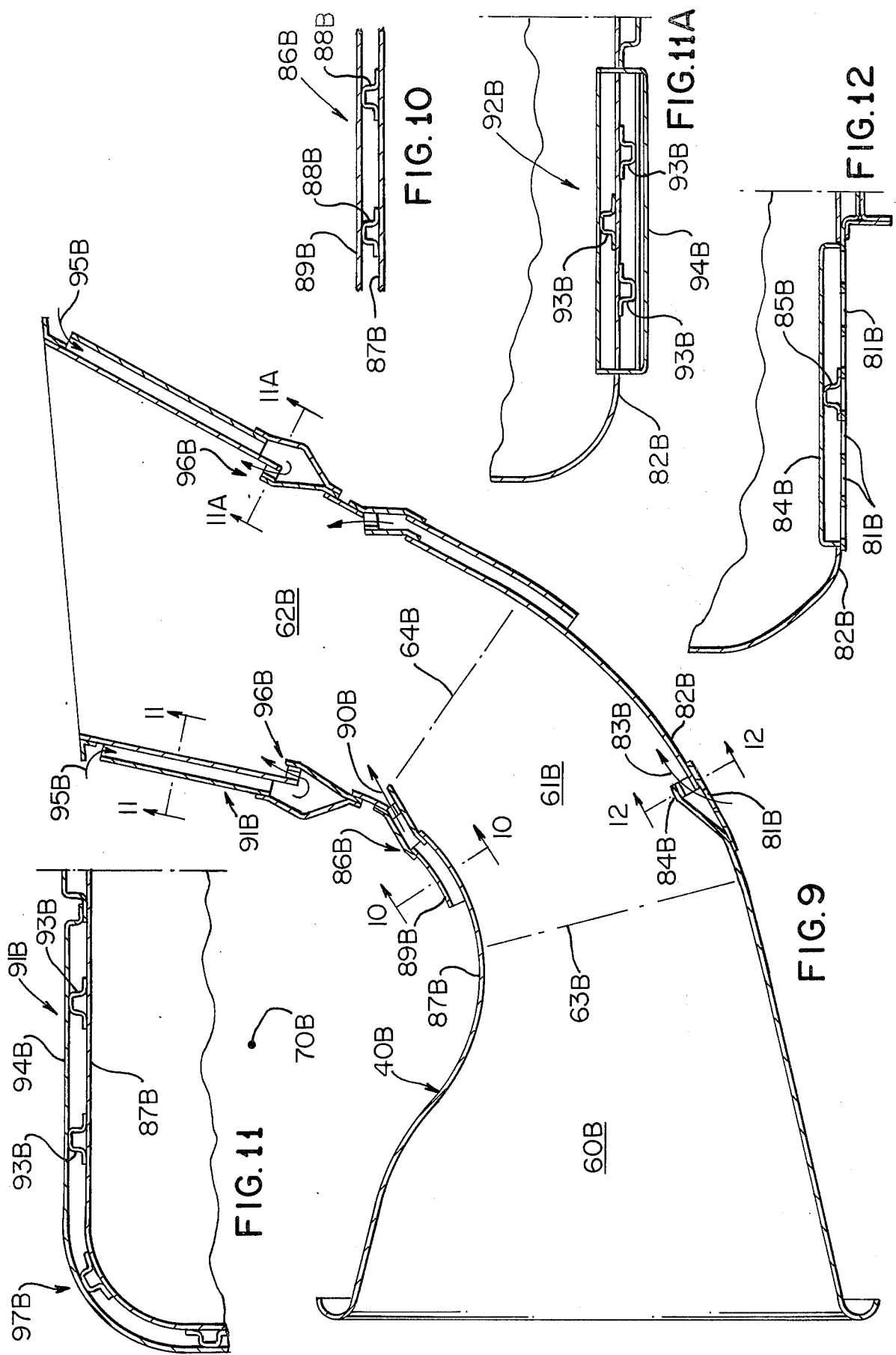

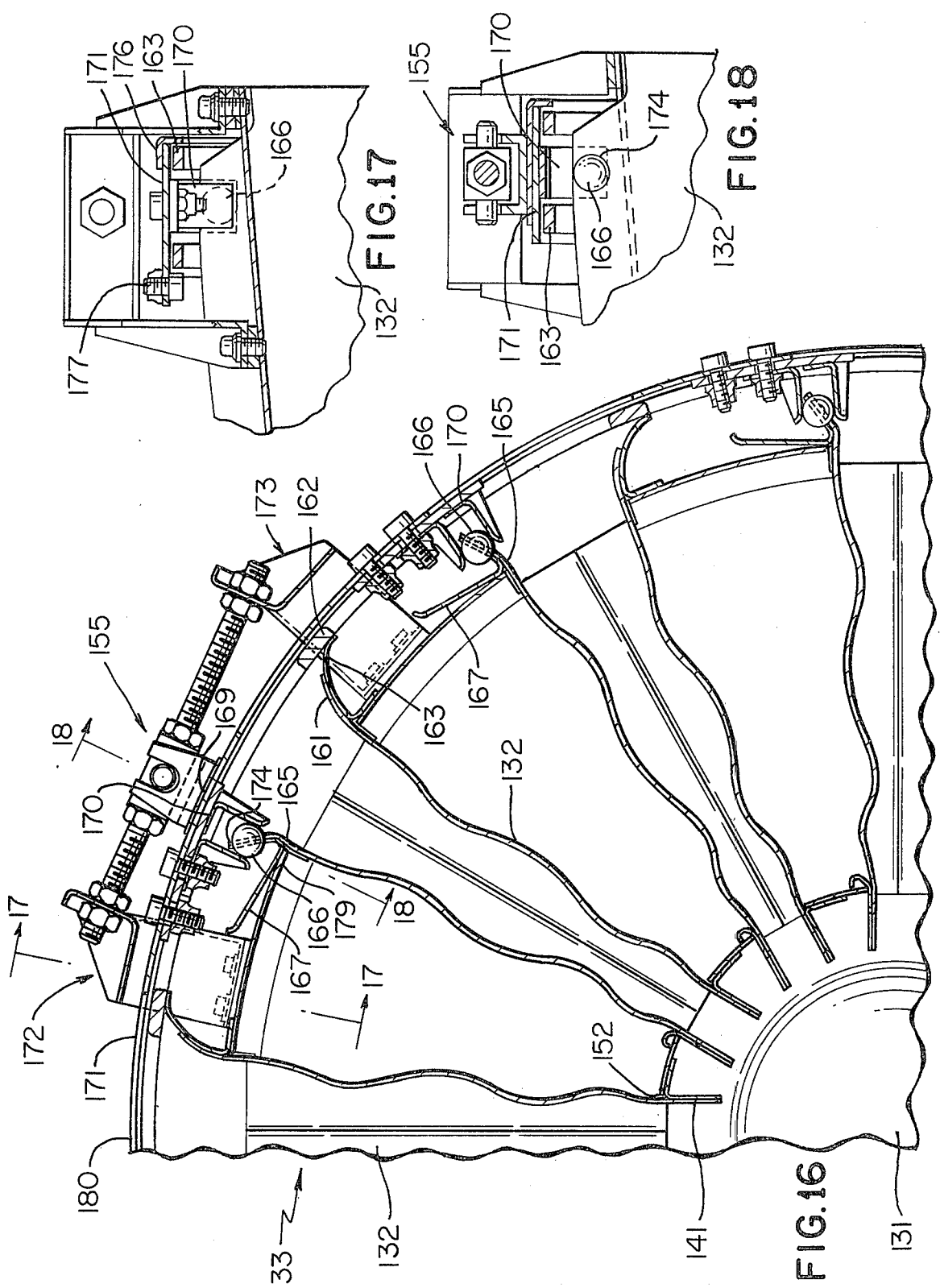

INFRARED RADIATION SUPPRESSOR FOR GAS TURBINE ENGINE

BACKGROUND OF THE INVENTION

In military conflicts there is a constant threat of enemy missles to aircraft. Many of these aircraft are powered by gas turbine engines and some of the missiles seek and home on infrared radiation emitted from exposed hot metal parts and from the hot exhaust plumes of such engines. Particularly when gas turbine engines are utilized in helicopter aircraft it is necessary to provide suppression of infrared radiation under conditions of hover or relatively low flight speed where ram air is not available as a source of cooling air.

Early approaches used to suppress infrared radiation emitted from hot engine parts were directed primarily to the use of sheet metal ducts, or the like, to turn or bend the engine exhaust gas flow path so as to prevent a direct line of sight to the hot engine parts. One design which was employed for this purpose was a simple upturned elbow of circular cross-sectional outline at each position therealong and which served to turn the gas turbine engine exhaust flow upwardly from a ground reference. Although such a simple 90° elbow did serve the purpose of preventing direct viewing of hot metal parts from the ground such an elbow has a serious shortcoming because when utilizing a gas turbine engine to power a helicopter which employs complex flight maneuvers, the hot inside edge of the duct becomes visible for horizontal viewing. Further, the hot exhaust gas plume from a gas turbine which employs such a simple upturned duct or elbow is fully visible.

Other infrared radiation suppressors proposed heretofore have utilized comparatively large center body designs, complex heat transfer panel designs, complicated turning vanes, twisted ducts, or the like. Still others of these previously proposed suppressors utilize air pumps, or the like, to physically pump or otherwise provide cooling air and at a substantial power loss or weight penalty.

Accordingly, the need exists for a simple and economical apparatus for suppressing infrared radiation emitted from hot metal parts from the aft end of a gas turbine engine and from the exhaust gas plume thereof during engine operation.

SUMMARY

This invention provides an apparatus for suppressing infrared radiation emitted from hot metal parts at the aft end of a gas turbine engine and from the exhaust gas plume thereof during engine operation and such apparatus is of simple and economical construction yet provides radiation suppression utilizing fixed, though adjustable, components which assure minimum drain of engine power.

Accordingly, it is a feature of this invention to provide an apparatus for suppressing infrared radiation of the character mentioned utilizing a simple dogleg duct of unique construction.

Another feature of this invention is to provide an apparatus for suppressing infrared radiation of the character mentioned which utilizes an ejector vane assembly which may be adjustable to provide different degrees or amounts of suppression of infrared radiation.

Another feature of this invention is to provide an apparatus for suppressing infrared radiation of the character mentioned which utilizes both an ejector vane assembly in cooperation with a dogleg duct.

Therefore, it is an object of this invention to provide an apparatus for suppressing infrared radiation emitted from hot metal parts at the aft end of a gas turbine engine and from the exhaust gas plume thereof having one or more of the novel features set forth above or hereinafter shown or described.

Other features, objects, details, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view illustrating a typical aircraft in the form of a helicopter which utilizes the apparatus of this invention for suppressing infrared radiation;

FIG. 2 is a view with parts in cross section, parts in elevation, and parts broken away illustrating details of the apparatus utilized on the helicopter of FIG. 1;

FIG. 3 is a perspective view of the dogleg duct illustrated in cross section in FIG. 2 and with the thermal insulation blanket shown in FIG. 2 removed;

FIG. 4 is a cross-sectional view taken essentially on the line 4—4 of FIG. 3;

FIG. 5 is a cross-sectional view taken essentially on the line 5—5 of FIG. 3;

FIG. 6 is a view taken essentially on the line 6—6 of FIG. 3;

FIG. 7 is a view taken essentially on the line 7—7 of FIG. 3;

FIG. 8 is a view similar to FIG. 3 showing a modification of the dogleg duct of this invention which employs turning vanes and also showing certain engine components associated therewith;

FIG. 9 is a cross-sectional view of another modification of the dogleg duct of this invention which utilizes integral wall cooling means;

FIG. 10 is a fragmentary cross-sectional view taken essentially on the line 10—10 of FIG. 9;

FIG. 11 is a fragmentary cross-sectional view taken essentially on the line 11—11 of FIG. 9 and taken only to one side of a plane bisecting such duct;

FIG. 11A is a view similar to FIG. 11 and taken essentially on the line 11A—11A of FIG. 9;

FIG. 12 is a view similar to FIG. 11 and taken essentially on the line 12—12 of FIG. 9;

FIG. 16 is a fragmentary view with parts in cross section and parts in elevation particularly illustrating an actuating mechanism associated with the ejector vane assembly of this invention;

FIG. 17 is a view taken essentially on the line 17—17 of FIG. 16;

FIG. 18 is a view taken essentially on the line 18—18 of FIG. 17;

DESCRIPTION OF ILLUSTRATED EMBODIMENTS

Figure 15:
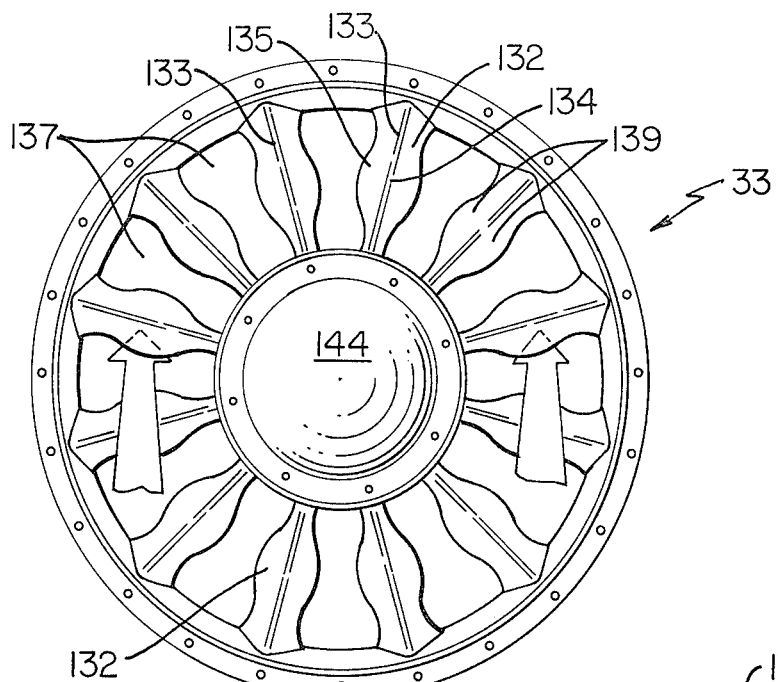
FIG. 15 is a view of the ejector vane assembly which is similar to FIG. 14 and looking away from the turbine of the gas turbine engine toward the vane assembly.

Reference is now made to FIG. 1 of the drawings which illustrates a typical aircraft shown in the form of a helicopter 30 which utilizes a gas turbine engine 31 as its main power source and such gas turbine engine 31 employs exemplary apparatus of this invention for suppressing infrared radiation emitted from hot metal parts at the aft end of the gas turbine engine and from the exhaust gas plume thereof during engine operation and such apparatus is designated generally by the reference numeral 32 in FIG. 2. The apparatus 32 comprises an ejector vane assembly which is designated generally by the reference numeral 33 and is provided for introducing ambient air into the hot engine exhaust gases in a manner to be described in detail subsequently and means for attaching the vane assembly 33 to the engine to receive the engine exhaust gases therethrough; and, in this example, such attaching means is designated generally by the reference numeral 34 and comprises a tubular duct 35 having suitable peripheral flanges at opposite end edges thereof and the flanges at the upstream edge thereof are suitably attached to associated flanges at the aft end of the engine as shown at 36 while flanges at the downstream edge thereof are attached to suitable flanges provided on structural components comprising the ejector vane assembly 33 as shown at 37 to provide a secure attachment for such ejector vane assembly.

The wedge-shaped duct 35 serves to provide a downward inclination from the center line 38 of the gas turbine engine 31. It should be noted that in the illustration of FIG. 2, the engine is shown inclined at a substantial angle to the horizontal and this has been done for drawing convenience; however, it will be appreciated that in the usual application, the engine center ine 38 is arranged substantially parallel to the longitudinal axis of the main fuselage of the helicopter 30.

The apparatus 32 of this example also includes means for receiving hot engine exhaust gases and cooling air from the ejector vane assembly and in this example such means is in the form of unique duct which is in the form of a dogleg duct 40 and such duct will now be described in detail.

The dogleg duct 40 of FIG. 2 has suitable means for supporting such duct adjacent the engine 31 and in this example the duct 40 has a substantially annular flange 41 provided with a plurality of mounting openings or holes 42 as shown in FIG. 3. The duct 40 also has what may be considered top and bottom stiffening flanges 43 and 44, one or both of which may be provided with holes 45 and in this example, the stiffening flange 44 is provided with such holes 45. The annular flange 41 and flange 44 are used to support the dogleg duct 40 adjacent the engine; and, suitable fasteners such as bolts (not shown) extend through the mounting holes 42 and 45 and serve to attach the dogleg duct 40 to air frame structure 46 adjacent the engine 31.

The dogleg duct 40 receives hot engine exhaust gases and cooling ambient air which has been mixed therewith in the ejector vane assembly 33 as indicated by the arrows 49 and 50 in FIG. 2. The dogleg duct 40 has a circular inlet 51 and a rectangular outlet 52, also see FIG. 3, and the circular inlet 51 is arranged substantially concentrically around the aft end portion of the engine 31 and in this example concentrically around the aft end of the ejector assembly 33 with an annular space 53 therebetween and for a purpose to be subsequently described.

The annular space 53 is particularly adapted to receive cooling ambient air therethrough, as indicated by the arrows 54, by ejector action during engine operation and such ejector action is a principle well known in the art so that the cooling air indicated by the arrows 54 is in essence a tubular blanket of air which mixes with the hot exhaust gases, indicated by the reference arrows 55, from the gas turbine engine 31. Ambient cooling air indicated by arrows 56 is also introduced by the ejector vane assembly 33 to provide a substantial volume of cooling air so that basically the total amount of cooling air 54 introduced through the annular space 53 together with the air 56 introduced by the ejector vane assembly 33 results in a weight flow which may range between 20 and 150% of the weight flow of the engine exhaust.

As will be readily apparent from FIG. 2 the dogleg duct 40 is comprised of basically three sections which are roughly bounded by dot-dash lines and include an inlet mixing section 60, an intermediate acceleration section 61, and an outlet diffuser section 62. The inlet mixing section 60 extends between the duct inelt 51 and a dot-dash line 63, the acceleration section 61 extends between dot-dash line 63 and a dot-dash line 64, and the diffuser section 62 extends between the dot-dash line 64 and the rectangular outlet 52.

The duct 40 has a circular inlet 51, as previously mentioned, which defines the inlet of the mixing section 60 and such mixing section has an outlet 65 of substantially rectangular outline as shown in FIG. 5. The circular inlet 51 of the duct 40 and hence the mixing section 60 and the rectangular outlet 65 of such mixing section 60 have a smooth transition portion therebetween which is designated generally by the reference numeral 66 in FIG. 3 and such smooth transition portion provides efficient mixing of cooling ambient air 54 received through annular space 53 and cooling ambient air 56 from vane assembly 33 with exhaust gases 55 received directly in the inlet 51.

As will readily be apparent from the drawings, the acceleration section 61 is a curved acceleration section which adjoins the inlet section 60 and the acceleration section curves substantially about an axis 70 which is shown as a dot in FIG. 2 inasmuch as such axis is substantially perpendicular to the plane of the paper illustrating FIG. 2. The acceleration section 61 has a gradually decreasing cross-sectional area at each position therealong in the direction of movement of the exhaust gases and cooling air and the acceleration and turning of fluid flowing through such acceleration is such as to assure turning of fluid flowing therethrough in a nonturbulent manner and rectangular outlet 65 is the inlet of section 61 and section 61 has an outlet 66 as shown in FIG. 4. A comparison of the areas at the inlet 65 and outlet 66 of section 61 as shown in FIGS. 5 and 4 respectively will show that outlet area 66 is smaller. Preferably the area decrease from inlet 65 to outlet 66 is gradual and such area decrease is also preferably generally of the order of 6 to 12% decrease.

The diffuser section 62 adjoins the acceleration section and the inlet of such diffuser section is defined by the rectangular outlet 66 of the acceleration section and the acceleration section has a substantially rectangular cross section at each position therealong. Thus, it will be appreciated that the acceleration and diffuser sections both have rectangular cross sections at each position therealong. Further, each of the rectangular outlines at each of the positions along the acceleration and diffuser sections has its longer dimension, i.e., the longer dimension of the basically rectangular outline arranged substantially parallel to the axis 70 and with this arrangement it will be appreciated that there is an improved visual blockage of the hot engine parts. The shorter dimension of each basically rectangular outline along the diffuser section basically increases in the direction of flow whereby the two sides 68 and 69, see FIG. 3, of the diffuser which are roughly parallel to the axis 70 flare outwardly and as will be readily apparent from FIGS. 3, 4, and 7; however, it will be appreciated that the other oppositely arranged sides may also flare outwardly in some applications provided the limits of aspect ratio now to be discussed are observed.

The shorter dimension of each rectangular outline along the acceleration section 61 and diffuser section 62 may vary within an aspect ratio which may range from 1½ to 5, for example. Accordingly, with an aspect ratio of 1½, the longer dimension is 1½ times longer than the shorter dimension of each rectangular cross section, and with an aspect ratio of 5, the longer dimension would be 5 times longer than the shorter dimension. There are extremes of aspect ratios for the rectangular cross section along the acceleration and diffuser sections, the optimum aspect ratios would be in the range of 2 to 4.

As seen in FIG. 2, the dogleg duct 40 has suitable thermal insulation means provided thereon and such thermal insulation means is shown in the form of a roughly tubular blanket which is designated generally by the reference numeral 73 and is shown by dot-dash lines in FIG. 2. The blanket 73 may be made of any suitable thermally insulating material known in the art such as fiberglass or fiberglass in combination with other suitable materials. The blanket 73 serves to shield the duct 40 and minimize the amount of infrared radiation which might be emitted therefrom; and, the blanket 73 is fastened and held in position using any suitable means and techniques known in the art.

It should be noted that in the illustrations of FIGS. 3-7, the duct 40 has not been shown with the insulating blanket 73 therearound. However, it is to be understood that such duct is normally provided with the insulating blanket 73 in the manner shown in FIG. 2.

Thus, it will be seen that the dogleg duct 40 due to the construction and arrangement thereof provides a line of sight indicated by the reference numeral 79 which assures that hot metal parts at the aft end of the gas turbine engine 31 are shielded from view.

Other exemplary embodiments of the dogleg duct 40 which may be used substantially interchangeably with the duct of FIG. 2 are illustrated in FIGS. 8 and 9. The ducts illustrated in FIGS. 8 and 9 are similar to the duct 40; therefore, such ducts will be designated by the general reference numerals 40A and 40B and representative parts of each duct 40A and 40B which are similar to corresponding parts of the duct 40 will be designated in the drawings by the same reference numeral as in the duct 40 (whether or not such parts are mentioned in the specification) followed by the associated letter designation either A or B and not described in detail. Only those parts of each duct which are different from corresponding parts of the duct 40 will be designated by a new reference numeral also followed by their associated letter designation and described in detail.

Referring now to FIG. 8 of the drawings, the duct 40A also has a circular inlet 51A and a rectangular outlet 52A and the duct 40A has an inlet mixing section 60A, acceleration section 61A, and a diffuser section 62A which are very similar to the corresponding sections of the duct 40. The main difference between the duct 40A and the duct 40 is that the duct 40A has a plurality of turning vanes which in this example are shown as a plurality of two turning vanes, each designated by the same reference numeral 74A.

The turning vanes 74A are arranged primarily in the acceleration section 61A and also curve about an axis 70A which is similar to the axis 70 of the duct 40. The turning vanes 74A have upstream portions 75A which are wedge-shaped or converge toward the engine 31 and each turning vane 74A has a downstream portion 76A which converges toward rectangular outlet 52A of such duct. The wedge-shaped portions 75A and 76A are joined by arcuate surfaces 77A and 78A. The vanes 74A are, in essence, airfoils which cooperate to further assure flow of exhaust gases and cooling air therethrough in a nonturbulent manner. The turning vanes provide exposed surface lines of sight each indicated by the reference numeral 80A which assure the hot metal parts at the aft end of the gas turbine engine 31 are shielded or blocked from view.

The dogleg duct 40A of FIG. 8 is shown without an insulation blanket 73, or the like, therearound. However, it will be appreciated that such duct 40A is preferably provided with an insulation blanket 73 for the same purpose as the insulation blanket 73 of the duct 40. It will also be appreciated that the duct 40A may be provided with integral cooling means on one or more of its sections 60A, 61A, and 62A, and such cooling means may be of the type to be described in detail in connection with the dogleg duct 40B which will now be described in detail.

The dogleg duct 40B of FIG. 9 also has a mixing section 60B, an acceleration section 61B, and a diffuser section 62B which are roughly separated by the lines 63B and 64B in a similar manner as described in connection with the duct 40. The duct 40B has integral wall duct cooling means provided as an integral part thereof and such cooling means are provided as heat transfer means in the form of integral heat transfer panel assemblies which may provide flow of cooling ambient air through slot means, through panels providing flow parallel with the fluid in the duct 40B, or through panels providing flow which is counter the fluid flow through such duct 40B.

In particular, as will be seen from FIGS. 9 and 12, cooling air flow may be provided by ejector action through slots 81B which introduce air along the inside surface of outside (outwardly convex) wall 82B as shown by the arrows 83B and the slots 81B in this example are shown provided in association with the acceleration section 61B. The air flowing through slots 81B is deflected by an inclined wall portion 84B within the duct 40B and portion 84B is also substantially U-shaped. The bight of the U-shaped portion 84B is supported in the central portion thereof by a substantially hat-shaped section or member 85B while serving as a structural member also serves to space the bight of member 84B from the outside wall 82B and also serves as a heat transfer member.

The acceleration section 61B has a wall 87B which is outwardly concave and wall 87B has a heat transfer panel assembly which is designated generally by the reference numeral 86B and the heat transfer assembly 86B employs a plurality of hat sections 88B and a wall 89B, as illustrated in FIG. 10, to provide a plurality of cooling passages along the heat transfer section 86B. The panel assembly provides air flow which is parallel to the flow of fluid through the duct 40B in the manner illustrated by the arrow 90B.

The duct 40B also has integral heat transfer means in the form of a heat transfer panel assemblies 91B and 92B associated with the diffuser sections 62B and such heat transfer assemblies are illustrated in FIGS. 11 and 11A respectively. The assembly 91B of FIG. 11 represents the heat transfer assembly associated with the duct wall 87B which is close to the axis 70B while the assembly 92B of FIG. 11A is associated with the lower half of the duct wall or wall 82B remote from axis 70B.

Each of the heat transfer panel assemblies 91B and 92B employs spaced hat sections 93B which are used to space outer walls 94B thereof in the manner illustrated in FIGS. 11 and 11A. The heat transfer panel assemblies 91B and 92B provide cooling air 95B which is basically in counterflow to the flow through the duct 40B. The counterflow cooling air 95B extends along a substantial portion of the diffuser section 62B and provides its cooling action therealong whereupon the cooling air flow is turned and enters inside of the duct 40B as illustrated in each instance at 96B. The basically counterflow cooling air 95B then mixes with the fluid in the duct 40B and discharges therewith from the duct 40B.

The heat transfer means or panels may extend along the flat wall portions of their associated duct sections as well as the curved or arcuate wall portions. To highlight this point it will be seen that the heat transfer assembly 91B extends along the curved wall portion as shown at 97B in FIG. 11. Usually it is less expensive to provide the heat transfer panels on the substantially flat wall portions.

Thus, it is seen that each dogleg duct 40, 40a, and 40B serves to suppress infrared radiation emitted from hot metal parts at the aft end of an associated gas turbine engine by hiding of such hot metal parts; and, each of such ducts also serves to suppress infrared radiation emitted from the exhaust plume of the gas turbine engine during operation by introducing substantial amounts of cooling ambient air into the hot engine exhaust gases with such air being introduced, in essence, as a continuous annulus or tubular blanket around the hot exhaust gases while also thoroughly mixing with such hot exhaust gases.

In this disclosure the dogleg duct is shown arranged downstream of the ejector assembly 33 and used therewith whereby the ambient air introduced by ejector action by the dogleg duct also mixes with ambient air introduced by the ejector vane assembly 33. However, it will also be appreciated that the improved dogleg duct of this invention need not necessarily be used in associated with the ejector vane assembly 33, but may be used in association with other suitable cooperating components whether part of the engine or airframe. It should be noted that the dogleg ducts 40A and 40B also preferably have each of their various sections such as the mixing section, acceleration section, and diffuser section constructed and arranged in accordance with the established parameters (such as aspect ratio, for example) described in more detail in connection with the duct 40.

Reference is made to the fact that each dogleg duct 40, 40A, and 40B has a rectangular outlet, that each diffuser and acceleration section has rectangular cross-sectional outline at each position therealong, and that each mixing section changes from a circular inlet to a rectangular outlet portion; however, it is to be understood that the reference to rectangular obviously does not mean perfectly rectangular as evidenced by the drawings where rounded corners are shown in each basically rectangular outline. Similarly it will be appreciated that instead of being rectangular, each duct may be flattened or substantially oval in configuration provided that the aspect ratios previously mentioned are adhered to. Accordingly, in the case of an oval duct, the aspect ratio refers to the longest dimension through the center of such duct as compared to the dimension through such center which is perpendicular to the longest dimension.

Each duct 40, 40A, and 40B has been referred to herein as being comprised of a plurality of sections; however, it is to be understood that such reference to sections has been made for convenience and does not necessarily represent separate parts which have been fixed together. Indeed, each duct 40, 40A, and 40B is a single unitary part which may have certain component portions suitably fixed together usually by welding, or the like. The ducts 40, 40A, and 40B are made of suitable materials in accordance with techniques known in the art and such materials are such that they are capable of withstanding the temperatures normally associated with a gas turbine engine, and such materials are such that they provide the desired heat transfer characteristics to provide the desired cooling of each duct in the manner described herein.

Having described the dogleg duct 40 and modifications thereof as defined by the ducts 40A and 40B, the detailed description will now proceed with a description of the unique ejector vane assembly 33 of this invention and for this description, reference is first made to FIGS. 2 and 13-15 of the drawings. The ejector vane assembly serves to introduce cooling ambient air 56 into the hot engine exhaust gases 55 and in order for the vane assembly 33 to operate satisfactorily, it will be appreciated that it is fixed to the engine by suitable means 34. In this example such means comprises the wedge-shaped tubular transition section 35 and the flanges illustrated at 36 and 37 and previously described.

The ejector vane assembly 33, in essence, serves to introduce cooling air at a plurality of angularly spaced positions about the engine exhaust as well as serving to introduce air in the center of the engine exhaust and all of such cooling air continues with and mixes with the engine exhaust to provide a diluting effect and optimum cooling of the type which is only capable by direct mixing of hot gases and cooling ambient air.

Figure 14:
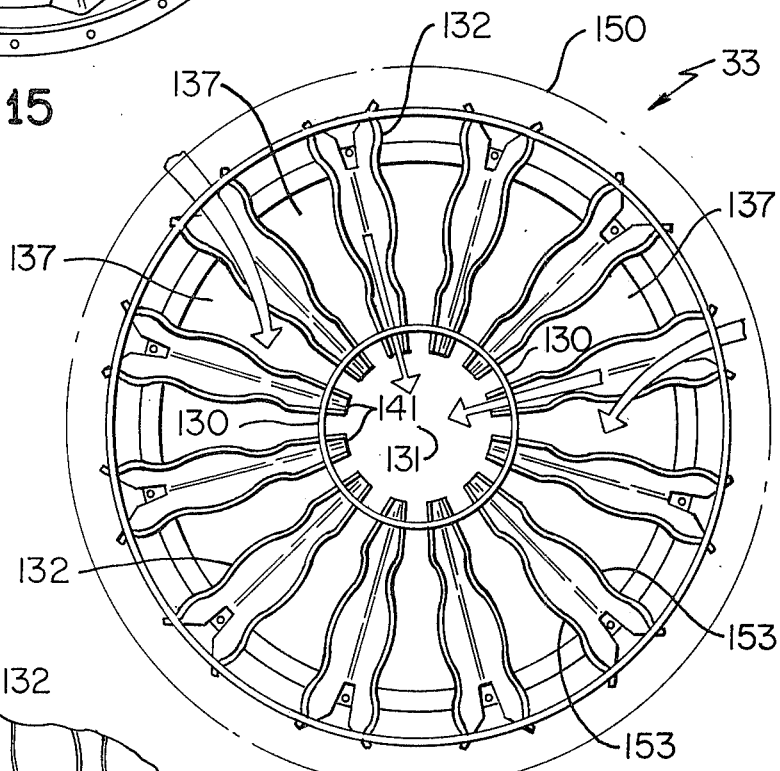
FIG. 14 is a view of the main part of the central portion of the ejector vane assembly looking from the aft end of the gas turbine engine toward such engine while illustrating, using dot-dash lines, an envelope about the ejector vane assembly which is blanketed with cooling ambient air.
Figure 13:
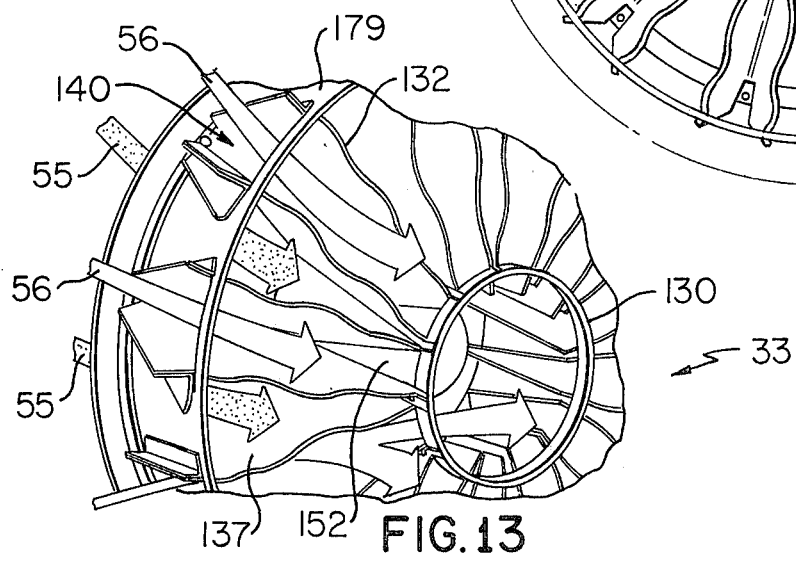
FIG. 13 is a fragmentary perspective view particularly illustrating an ejector vane assembly of this invention and the manner in which such assembly provides unique mixing of cooling ambient air with hot engine exhaust gases.

The assembly 33 comprises a central tubular support 130 having a central axis 131, see FIGS. 13 and 14, and having a plurality of what might be considered roughly V-shaped vanes, each designated by the same reference numeral 132 and with the vanes being arranged in substantially equally angularly spaced relation about the tubular support 130 and with their apexes 133 arranged substantially perpendicular to the central axis 131 and as will be more readily apparent from FIG. 15. The outside surfaces 134 of the apexes 133 are arranged so that they face the gas turbine engine 31; and, each vane 132 has outside surfaces 135 extending in a diverging manner from the apexes 133 whereby engine exhaust impinges against the outside surfaces 134 of the apexes 133 and against the outside surfaces 135.

The V-shaped vanes 132 are adapted to receive engine exhaust gases thereagainst and the vanes 132 separate the exhaust gases into a plurality of streams which may be considered radial streams each flowing through an associated radial passage and a representative few of such radial exhaust gas passages have been designated by the same reference numeral 137. Because the substantially V-shaped vanes 132 are arranged in equally angular spaced relation about the central axis 131 of the assembly 33, the radial streams 137 are also arranged in equal angularly spaced relation about such central axis.

The V-shaped vanes 132 have outer portions which are open as indicated at 140 in FIG. 13 and such other portions are adapted to receive ambient cooling air 56 therethrough by ejector action produced by the engine exhaust flowing through the ejector assembly 33. The ejector vanes 132 have inner portions designated by the reference numerals 141 which introduce cooling air into the central portion of the engine exhaust gases and, in essence, within the tubular portion 130. With this arrangement of vanes 132 it is seen that such vanes introduce ambient cooling air into the central portion of the engine exhaust gases and between the plurality of radial streams 137 of exhaust gases within a minimum axial length and such minimum axial length is indicated at 142 in FIG. 2.

As seen in FIG. 15 of the drawings, the ejector vane assembly 33 is closed in the center thereof by a domed portion 144 which is convex in the direction away from the gas turbine engine 31 and it will be seen that the domed portion serves as a deflector which deflects the cooling ambient air 56 which is flowing radially inwardly toward the central axis 131 so that such air flows substantially parallel to and with the engine exhaust gases. It will also be seen that the domed portion is suitably fixed in position by suitable flanges as shown at 145 and is closed in the upstream portion thereof by a substantially tubular section 146 which has a closed forward end 147, see FIG. 2.

The ejector vane assembly 33 with its substantially V-shaped ejector vanes 132, in essence, also introduces cooling ambient air by ejector action about the entire periphery of the ejector vane assembly 33 whereby a tubular blanket of air designated by dot-dash lines 150 in FIG. 14 is provided in surrounding relation about the ejector vane assembly 33. Thus, the hot exhaust gases from the gas turbine engine 31 in essence are cooled by cooling ambient air which is introduced by assembly 33 in the center of the hot gases, radial streams of cooling air between the radial streams 137 of hot gases, and by the tubular blanket 150 of cooling air. All of this cooling air is mixed in an efficient manner with the hot engine exhaust gases to lower the exhaust gas temperature and thus lower the temperature of metal parts being contacted by the mixture while lowering the temperature of the exhaust plume so that it is substantially free of infrared radiation capable of being detected.

It will also be seen that in order for the inner portions 141 of each V-shaped vane 132 to provide optimum air flow therethrough, the tubular portion 130 has a plurality of wedge-shaped slots each of which is designated generally by the reference numeral 152, see FIG. 13, and the wedge-shaped slots 152 allow air to be introduced into the tubular portion 130 whereupon such ambient air then flows out of the tubular portion in the manner shown schematically by the single arrow 49 in FIG. 2.

Each V-shaped vane 132 has its inner portion suitably fixed to the tubular portion 130 using any technique known in the art, such as welding or the like. However, the outer portion of each vane is constructed and arranged in the manner now to be presented.

Each ejector vane 132 has been described as being substantially V-shaped and it will be appreciated that such V-shape is determined by looking at such ejector vane either radially inwardly or outwardly substantially perpendicular to the axis 131 of the assembly 33. It will also be seen that each vane 132 has opposed sides 139 provided with the previously described outside surfaces 135 and the sides 139 and hence surfaces 135 diverge from an apex 133. Each side 139 and surface 135 has an undulating configuration as illustrated at typical locations 153 in FIG. 14. The undulating configurations of the diverging sides 139 assure mixing of the hot engine exhaust gases with the cooling ambient air in a nonturbulent manner and the number of undulations, the placement thereof, and their detailed configuration is determined for each particular engine application. The undulating configurations of the diverging sides 135 of each vane 132 also serves to improve the conductive heat transfer between the hot engine exhaust gases and the cooling ambient air.

Having described the construction and arrangement of the V-shaped vanes 132, the detailed description will now proceed with a description of adjustment means which is preferably provided as an integral part of the ejector vane assembly 33. The adjustment means or mechanism of this example is designated generally by the reference numeral 155 and enables the vanes 132 of the ejector assembly 33 to be effectively closed so that cooling ambient air is not introduced by the ejector assembly and under such conditions there would be substantially no power loss in the gas turbine engine due to the operation of the ejector assembly. Nevertheless, even with the assembly 33 fully open the power loss in the gas turbine engine 31 is no more than 6% and generally of the order of 3 to 4% and even less.

Figure 19:
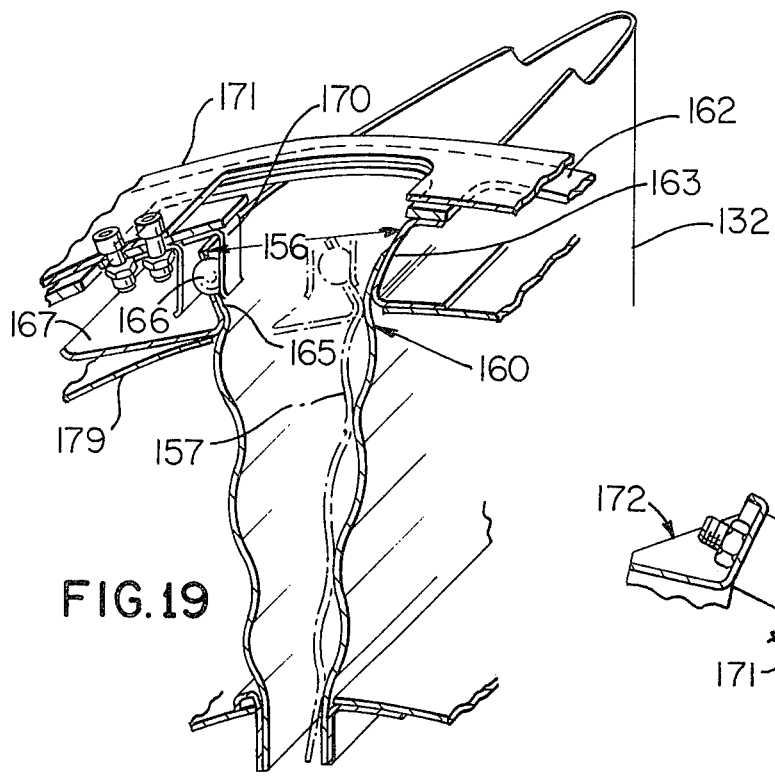
FIG. 19 is a fragmentary perspective view particularly illustrating a single V-shaped vane of the ejector vane assembly.

The vane actuation means or mechanism 155 for the ejector vane assembly 33 is best seen in FIGS. 16–20 of the drawings; however, before proceeding with the description of the assembly 155, it will be seen from FIG. 16 that the inner portion 141 of each ejector vane 132 is held substantially straight and extends through an associated slot 152. As previously mentioned each inner end portion 141 of each vane 132 is preferably fixed in position by welding, or the like; however, as seen in FIG. 19, each outer end portion of each vane has at least a part thereof which is movable whereby a typical V-shaped vane 132 in its full open position has a maximum design width 156. Each vane 132 may be closed to the dotted line position illustrated at 157 in FIG. 19 to thereby effectively prevent any air flow into the vanes with such air flow being prevented by the inside surface portions of the vanes being in contact with each other as indicated at 160, for example.

Referring to FIG. 16, each vane 132 has a portion 161 which is suitably fixed to a stationary ring 162 of the ejector vane assembly 33 and for this purpose each vane has an arcuate portion 163 extending between portion 161 and the stationary inner ring 162. Each V-shaped vane 132 has a movable end portion 165 arranged opposite from portion 161 and portion 165 has a spherical member 166 suitably associated with the outer end thereof and in a manner to be described later. Each vane 132 also has a roughly angled or L-shaped component or wing 167 which has a part thereof fixed to portion 165 and such part also associates with member 166. The spherical member or ball 166 is engaged by a U-shaped or caliper shaped assembly 170 which is suitably fixed to an outer ring 171 which is arranged concentrically around stationary inner ring 162 and rotatable thereabout by mechanism 155 as will now be described.

The manual adjustment mechanism 155 has its opposite end portions fixed to the stationary inner ring 162 as shown at 172 and 173, and the mid portion of the mechanism 155 is fixed to the rotatable outer ring 171 by a member 169 which is suitably fixed to ring 171 by welding or other suitable means. Thus, upon moving the adjustment mechanism 155 the outer ring 171 is moved (rotated) concentrically around the central axis 131 of the assembly 33 thereby moving each U-shaped member 170 and thus each spherical member 166 and portion 165 of each vane 132 whereby movement may be achieved from the solid line position illustrated in FIG. 19 to the dotted line position illustrated therein. It will also be appreciated that during this movement, each wing portion 167 is in contact with an associated wall defining member 179 of the assembly 33 and at all positions of each end portion 165, portion 179 alone or in combination with wing portion 167 defines a gas boundary for the engine exhaust gases. In particular, each member 179 ordinarily defines the outermost exhaust gas boundary while the tubular portion 130 defines the innermost exhaust gas boundary of an associated radial stream 137 of exhaust gases. When the vanes 132 are partially or fully closed by the action of outer ring 171 each wing member 167 cooperates with a member 179 to define such outermost gas boundary.

The utilization of spherical members or balls 166 each associated with one vane 132 enable the outer ring 171 to be actuated or moved by the mechanism 155 without binding or obstruction. Thus, each vane 132 may be moved from the solid line position thereof as shown in FIG. 19 to the dotted line position thereof in a non-binding manner. Only a single ball 166 is associated with an end portion 165 of an associated V-shaped vane 132 whereby the movement produced by the ring 171 need not necessarily be a perfectly rotational movement about axis 131 yet all vanes are moved in a non-binding manner.

The non-binding movement is assured because each spherical member or ball 166 is disposed in an associated common slot 174 which extends through the vertical leg portion of a wing member 167 and through portion 165 of an associated vane. Each ball 166 thus allows the outer portion of one leg or side of a vane 132 associated therewith to be moved toward and away from a stationary side thereof in a non-binding manner.

The outer ring 171 is prevented from axial sliding movement (parallel to axis 131) by one or more L-shaped or angled members 176 suitably fixed to one edge portion thereof and by a plurality of nut and bolt assemblies 177 suitably fixed to the opposite edge portion thereof.

The outer ring 171 also has a plurality of comparatively large openings therein, each designated generally by the reference numeral 180 and the openings 180 are provided to assure that cooling ambient air 56 will flow therethrough and into the outer ends of the vanes 132 in an unobstructed manner. Further, to assure that cooling ambient air flows radially inwardly into each V-shaped vane 132 in a smooth nonturbulent manner, it will be seen that the outer portions 161 and 165 of each vane have an outwardly flared configuration as illustrated at 181 in FIG. 20. Each opening 180 in the ring 171 is of substantial circumferential length to assure unobstructed flow of air therethrough and into its associated vane regardless of the position of the rotatable outer ring 171.

The mechanism 155 serves to provide manual adjustment of the outer ring 171 and of the outer end portions of all vanes 132 in a simultaneous manner and is in the form of a simple adjustable screw assembly; and, it will be appreciated that such screw assembly may be operated in accordance with techniques known in the art.

Figure 21:
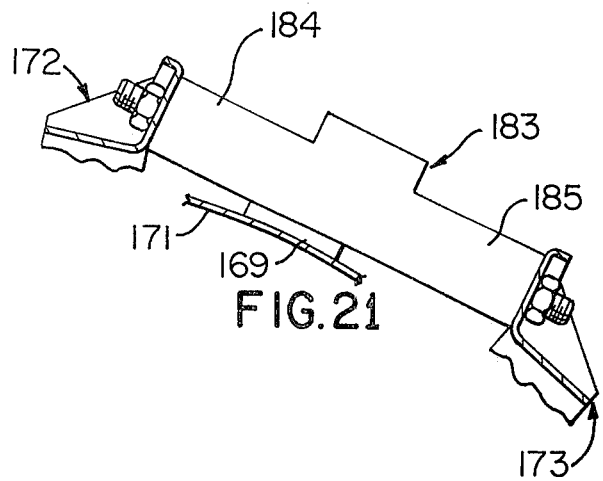
FIG. 21 is a view with parts shown schematically particularly illustrating a device for automatically moving the vanes of the vane assembly.
Figure 20:
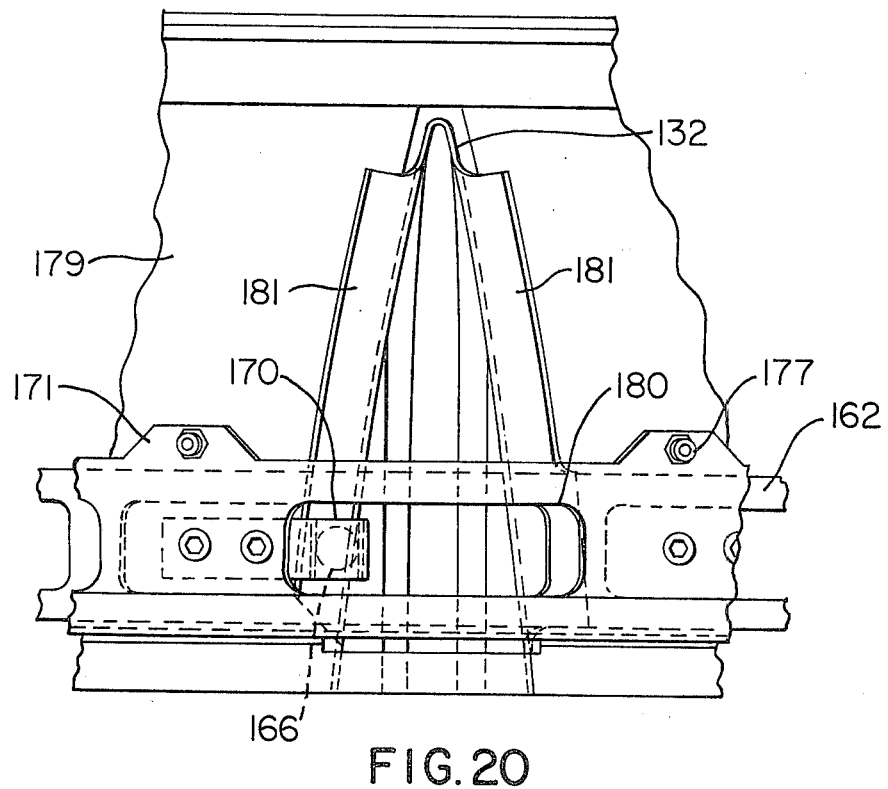
FIG. 20 is a fragmentary view looking perpendicularly toward the inlet of a typical vane of the vane assembly.

It will also be appreciated that the mechanism 155 may be replaced with a substantially fully automatic device 183 illustrated in a basically schematic manner in FIG. 21. The device 183 has opposite end portions 184 and 185 fixed to the stationary inner ring at 172 and 173 respectively; and, in a similar manner as shown and described for the mechanism 155 the device 183 has its mid portion fixed to the rotatable outer ring 171 using a member also designated by the reference numeral 169. The device 183 has suitable drive means of any well known type for moving its member 169 and hence the ring 171 and device 183 may be operated in flight to provide maximum infrared suppression by opening the vanes 132 to the solid line position illustrated in FIG. 19 for a typical vane. When the aircraft or helicopter 30 is in normal flight away from a potential enemy threat, the vanes may be fully closed so that each vane is essentially in the dotted line position illustrated in FIG. 19 thereby assuring optimum engine performance substantially without engine power loss.

The device 183 may be a simple full ON or full OFF device. The device 183 may also be operatively associated with suitable means (not shown) which take into account ram air available, engine power setting, and the like, to provide partial actuation or movement of the vanes 132 to some position intermediate the full closed and full open positions whereby the device 183 may provide infinite adjustment of the effective area of each vane taking into account engine power while still introducing cooling air sufficient to satisfactorily suppress infrared radiation. It will also be appreciated that such an infinitely variable device may also be monitored by suitable infrared radiation sensing means located such as to sense such radiation emitted from the exhaust plume of the gas turbine engine.

In this disclosure the vane assembly 33 is shown with its plurality of vanes being actuated by a single mechanism 155 or device 183. However, it will be appreciated that any desired number of actuating mechanisms 155 or devices 183 (or similar devices) may be provided for this purpose provided such plurality of components are operated in a cooperating manner.

The ejector vane assembly 33 of this invention, in essence, employs the ejector principle to suppress infrared radiation emitted from hot metal parts at the aft end of a gas turbine engine as well as emitted from the exhaust plume of such engine. Further, the ejector vane assembly 33 is, in essence, a fixed construction, which though adjustable, provides different amounts of secondary or cooling ambient air flow therethrough. Accordingly, such ejector vane assembly 33 does not rely on complex devices such as air pumps, or the like, which must be driven by a gas turbine engine or other power source at a considerable penalty in weight or at a considerable power loss.

The ejector vane assembly 33 is shown utilized with the various embodiments of a dogleg duct in this disclosure of the invention; however, it will be appreciated that such vane assembly need not necessarily be utilized with the dogleg duct as disclosed herein but may be used with other means, or other ducts, which are in operative association with the ejector vane assembly and are particularly adapted to receive cooling ambient air introduced by the ejector vane assembly so that it may be thoroughly mixed in the unique manner disclosed herein to provide infrared suppression of the character mentioned.

The apparatus for suppressing infrared radiation disclosed herein is of simple and lightweight construction and may be used within a minimum outside envelope. Further, such apparatus is readily adaptable to existing gas turbine engine installations.

In this disclosure of the invention, the apparatus for suppressing infrared radiation is shown in association with a gas turbine engine used on a helicopter. However, it will be appreciated that apparatus for suppressing infrared radiation of this invention may be used in association with gas turbine engines as well as other types of engines used on other types of aircraft including fixed wing aircraft, missiles, and the like.

While present exemplary embodiments of this invention, and methods of practicing the same, have been illustrated and described, it will be recognized that this invention may be otherwise variously embodied and practiced within the scope of the following claims.

What is claimed is:

1. An apparatus for suppressing infrared radiation emitted from hot metal parts at the aft end of a gas turbine engine and from the exhaust gas plume thereof during engine operation comprising of dogleg duct and means supporting said duct adjacent said engine to receive its exhaust gases, said duct comprising, an inlet mixing section having a circular inlet arranged concentrically around said aft end with an annular space therebetween and having a substantially rectangular outlet, said annular space being adapted to receive cooling ambient air therethrough by ejector action during engine operation, said circular inlet and rectangular outlet having a smooth transition portion therebetween which provides efficient mixing of said ambient air with said exhaust gases, a curved acceleration section adjoining said inlet section, said acceleration section curving about an axis and having a substantially rectangular cross-sectional outline and a gradually decreasing cross-sectional area at each position therealong assuring acceleration and turning of fluid flowing therethrough in a nonturbulent manner, and a diffuser section adjoining said acceleration section and having a substantially rectangular outline at each position therealong, each of said rectangular outlines at each of said positions along said acceleration and diffuser sections having its longer dimension side arranged substantially parallel to said axis to thereby provide visual blockage of said hot metal parts.

2. An apparatus as set forth in claim 1 and further comprising means thermally insulating said duct.

3. An apparatus as set forth in claim 1 and further comprising a fiberglass blanket support about said duct to provide thermal insulation therefor.

4. An apparatus as set forth in claim 1 and further comprising integral cooling means for said duct.

5. An apparatus as set forth in claim 1 in which at least one of said sections has cooling means provided as an integral part thereof, said cooling means utilizing ambient air to provide a cooling action.

6. An apparatus as set forth in claim 1 in which at least one of said sections has heat transfer panels provided as an integral part thereof with said panels utilizing ambient air to provide a cooling action.

7. An apparatus as set forth in claim 1 and further comprising heat transfer panels provided as an integral part of said duct and utilizing ambient air to provide a cooling action, said integral heat transfer panels comprising a plurality of cooling slots in said mixing section for receiving cooling air therethrough, at least one heat transfer panel in said acceleration section which provides a flow of cooling air therethrough in parallel flow relation with fluid moving through said duct, and at least one heat transfer panel in said diffuser section providing cooling air in counterflow with the flow of fluid through said duct.

8. An apparatus as set forth in claim 1 in which said means supporting duct adjacent said engine comprises a plurality of flanges provided as an integral part of said duct with each of said flanges having openings therein adapted to receive fasteners for fastening said duct independently of said engine.

9. An apparatus as set forth in claim 1 and further comprising at least one turning vane provided in said acceleration section of said duct, said turning vane providing improved visual blockage of said hot metal parts.

10. An apparatus as set forth in claim 1 and further comprising a plurality of turning vanes provided as an integral part of said duct, each of said turning vanes being disposed primarily in said acceleration section and curving about said axis and each of said turning vanes having tapering upstream and downstream portions particularly adapted to assure flow of fluid therethrough in said nonturbulent manner, said turning vanes providing improved visual blockage of said hot metal parts.

11. An apparatus for suppressing infrared radiation emitted from hot metal parts at the aft end of a gas turbine engine and from the exhaust plume thereof during engine operation comprising; an ejector vane assembly for introducing cooling ambient air into the hot engine exhaust gases; means attaching said vane assembly to said engine to receive engine exhaust gases therethrough; and means receiving said engine exhaust gases and cooling air from said ejector vane assembly; said assembly comprising, a central tubular support having a central axis and a plurality of roughly V-shaped vanes arranged in equally angularly spaced relation about said tubular support with their apexes extending radially outwardly from said support and arranged substantially perpendicular to said central axis and the outside surfaces of said apexes facing toward said engine, said V-shaped vanes being adapted to receive engine exhaust gases thereagainst and separate said exhaust gases into a plurality of streams arranged in angularly spaced relation about said central axis, each of said V-shaped vanes having a pair of sides adjoining its apex, the outer end portions of said vanes being adapted to receive cooling ambient air therethrough by ejector action produced by said engine exhaust and said sides of said vanes having inner end portions which introduce cooling air into said tubular support, said vanes introducing cooling ambient air into the central portion of said engine exhaust gases as well as between said plurality of streams of exhaust gases to provide optimum mixing action within an axial length defined by the dimension of said assembly along said central axis.

12. An apparatus as set forth in claim 11 in which said axial length of said assembly along said central axis is a fractional part of the maximum radius of said vanes of said vane assembly.

13. An apparatus as set forth in claim 11 in which each of said vanes has an outer portion which flares radially outwardly to assure unobstructed flow of ambient cooling air therein.

14. An apparatus as set forth in claim 11 in which each of said vanes has a pair of sides adjoining its apex and each of said sides has an undulating configuration which promotes heat transfer between cooling ambient air received within each vane and hot engine exhaust gases flowing against and along outside surfaces of said sides.

15. An apparatus as set forth in claim 11 in which said central tubular support has a plurality of slots therein which are adapted to receive cooling ambient air therethrough to provide said cooling air into said central portion of said exhaust gases.

16. An apparatus as set forth in claim 11 and further comprising closure means in the upstream portion of said tubular support, said upstream portion closure means blocking engine exhaust gases from flowing through said tubular portion.

17. As apparatus as set forth in claim 16 in which said vane assembly has a domed portion which is convex in the direction away from said gas turbine engine, said convex portion serving as a deflector which deflects cooling ambient air which is flowing radially inwardly toward said central axis so that said cooling air flows substantially parallel to and with said engine exhaust gases.

18. An apparatus as set forth in claim 11 in which each of said vanes has a pair of sides adjoining its apex and each of said vanes has an outer portion which flares radially outwardly to assure unobstructed flow of cooling ambient air therein, each of said sides of each vane having an outwardly convex configuration at its outer end and the outwardly convex configurations at the outer ends of a pair of associated sides cooperating to define an outwardly flared outer portion.

19. An apparatus as set forth in claim 11 in which one of said sides of each vane is held in a stationary position and the other of said sides of each vane is movable toward and away from its associated stationary side, said movable sides being movable to control the effective cooling air inlet area at the outer ends of said vanes, said vanes cooperating to introduce cooling ambient air so as to provide a tubular blanket of cooling ambient air about the entire vane assembly.

20. An apparatus as set forth in claim 19 and further comprising means for moving said movable sides of said vanes.

21. An apparatus as set forth in claim 19 and further comprising a mechanism for incrementally adjusting the positions of said movable sides of said vanes.

22. An apparatus as set forth in claim 19 wherein the said one sides of the said vanes are fixed to an inner stationary ring and the said movable sides of the said vanes are fixed to an outer ring which is arranged concentrically around said inner ring and is rotatable thereabout, said outer ring being adapted to be rotated to move the movable sides of said vanes.

23. An apparatus as set forth in claim 22 and further comprising means for rotating said outer ring and hence moving the movable sides of said vanes in a simultaneous manner.

24. An apparatus as set forth in claim 23 in which said means for rotating said outer ring comprises a mechanism for adjustably positioning said outer ring.

25. An apparatus as set forth in claim 23 in which said means for rotating said outer ring comprises a device for positioning said outer ring to an infinite number of positions and in an automatic manner.

26. An apparatus for suppressing infrared radiation emitted from hot metal parts at the aft end of a gas turbine engine and from the exhaust plume thereof during engine operation comprising: an ejector vane assembly for introducing cooling ambient air into the hot engine exhaust gases; means attaching said vane assembly to said engine to receive engine exhaust gases therethrough; and a dogleg duct receiving said engine exhaust gases and cooling air from said ejector vane assembly; said vane assembly and dogleg duct cooperating to provide visual blockage of said hot metal parts; said assembly comprising a central tubular support having a central axis and a plurality of roughly V-shaped vanes arranged in equally angularly spaced relation about said tubular support with their apexes arranged substantially perpendicular to said central axis and the outside surfaces of said apexes facing toward said engine, said V-shaped vanes being adapted to receive engine exhaust gases thereagainst and separate said exhaust gases into a plurality of streams arranged in angularly spaced relation about said central axis, said V-shaped vanes having outer end portions adapted to receive cooling ambient air therethrough by ejector action produced by said engine exhaust and said vanes having inner end portions which introduce cooling air into said tubular support, said vanes introducing cooling ambient air into the central portion of said engine exhaust gases as well as between said plurality of streams of exhaust gases to provide optimum mixing action within an axial length defined by the dimension of said assembly along said central axis; said dogleg duct comprising an inlet mixing section having a circular inlet arranged concentrically around said ejector vane assembly with an annular space therebetween and having a substantially rectangular outlet, said annular space being adapted to receive cooling ambient air therethrough also by ejector action during engine operation, said circular inlet and rectangular outlet having a smooth transition portion therebetween which provides efficient mixing of said ambient air with said exhaust gases, a curved acceleration section adjoining said inlet section, said acceleration section curving about an axis and having a substantially rectangular cross-sectional outline and a gradually decreasing cross-sectional area at each position therealong assuring acceleration and turning of fluid flowing therethrough in a nonturbulent manner, and a diffuser section adjoining said acceleration section and having a substantially rectangular outline at each position therealong, each of said rectangular outlines at each of said positions along said acceleration and diffuser sections having its longer dimension side arranged substantially parallel to said axis to thereby assure said visual blockage of said hot metal parts.

27. An apparatus as set forth in claim 26 in which said gradually decreasing cross-sectional area in said acceleration section of said duct decreases between 6 and 12 percent.

28. An apparatus as set forth in claim 26 in which each of said rectangular outlines at each of said positions along said acceleration and diffuser sections has its longer and shorter dimension sides defining an aspect ratio ranging between 1.5 to 5.

29. An apparatus as set forth in claim 28 in which said aspect ratio is preferably within the range of 2 to 4.

* * * * *

UNITED STATES PATENT OFFICE
CERTIFICATE OF CORRECTION

Patent No. 4,018,046   Dated April 19, 1977

Inventor(s) John F. Hurley

It is certified that error appears in the above-identified patent and that said Letters Patent are hereby corrected as shown below:

Col. 3, line 51, "ine 38" should read -- line 38 -- ;

Col. 4, line 37, "inelt" should read -- inlet -- .

Col. 7, line 51, "40a" should read -- 40A -- .

Col. 8, line 2, "associated" should read -- association -- .

Col. 13, line 59 (Claim 1, line 4), "of" should read -- a -- .

Col. 14, line 12 (Claim 3, line 2), "support" should read -- supported -- ;

Col. 14, line 37 (Claim 8, line 2), after "supporting" insert -- said -- .

Col. 15, line 46 (Claim 17, line 1), "As" should read -- An -- .

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*